United States Patent
Cullen et al.

[11] Patent Number: 6,139,935
[45] Date of Patent: *Oct. 31, 2000

[54] OXYGEN-ABSORBING LABEL

[75] Inventors: John S. Cullen, Buffalo; Ronald C. Idol, Amherst; Thomas H. Powers, Mayville, all of N.Y.

[73] Assignee: Multisorb Technologies, Inc., Buffalo, N.Y.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/928,168

[22] Filed: Sep. 12, 1997

Related U.S. Application Data

[63] Continuation of application No. 07/748,760, Aug. 23, 1991, Pat. No. 5,667,863, which is a continuation-in-part of application No. 07/638,494, Jan. 7, 1991, abandoned.

[51] Int. Cl.$^7$ ...................................................... B32B 3/06
[52] U.S. Cl. ............................ 428/68; 206/204; 206/484; 252/188.1; 252/188.28; 426/262; 426/541; 428/36.6; 428/36.7; 428/70; 428/76
[58] Field of Search .......................... 428/68, 36.6, 36.7, 428/70, 76; 206/204, 484; 252/188.1, 188.28; 426/262, 541

[56] References Cited

U.S. PATENT DOCUMENTS

| | | | |
|---|---|---|---|
| 1,821,388 | 9/1931 | Maude et al. | 252/188.28 |
| 2,825,651 | 3/1958 | Loo et al. | 99/171 |
| 3,480,402 | 11/1969 | Jackson | 116/206 |
| 4,127,503 | 11/1978 | Yoshikawa et al. | 252/429 R |
| 4,166,807 | 9/1979 | Komatsu et al. | 252/439 |
| 4,192,773 | 3/1980 | Yoshikawa et al. | 252/429 R |
| 4,230,595 | 10/1980 | Yamaji et al. | 252/188 |
| 4,279,350 | 7/1981 | King | 215/228 |
| 4,317,742 | 3/1982 | Yamaji et al. | 252/188 |
| 4,406,813 | 9/1983 | Fujishima et al. | 252/188.28 |
| 4,421,235 | 12/1983 | Moriya | 206/524.2 |
| 4,510,162 | 4/1985 | Nezat | 426/124 |
| 4,588,561 | 5/1986 | Aswell et al. | 422/238 |
| 4,711,741 | 12/1987 | Fujishima | 252/188.28 |
| 4,752,002 | 6/1988 | Takahashi et al. | 206/204 |
| 4,769,175 | 9/1988 | Inoue | 252/188.28 |
| 4,792,484 | 12/1988 | Montani | 428/323 |
| 4,813,791 | 3/1989 | Cullen et al. | 383/40 |
| 4,815,590 | 3/1989 | Peppiatt et al. | 206/204 |
| 4,907,393 | 3/1990 | Omori et al. | 53/410 |
| 4,977,009 | 12/1990 | Anderson et al. | 429/76 |
| 4,992,410 | 2/1991 | Cullen et al. | 502/407 |
| 5,085,878 | 2/1992 | Hatakeyama | 252/188.28 |
| 5,089,323 | 2/1992 | Nakae | 428/220 |
| 5,102,673 | 4/1992 | Sugihara | 252/188.28 |
| 5,116,660 | 5/1992 | Komatsu | 428/192 |
| 5,667,863 | 9/1997 | Cullen | 428/68 |

FOREIGN PATENT DOCUMENTS

| | | |
|---|---|---|
| 0367390 | 5/1990 | European Pat. Off. . |
| 54-13272 | 2/1979 | Japan . |
| 119418 | 9/1980 | Japan . |
| 55-116434 | 9/1980 | Japan . |
| 55-116435 | 9/1980 | Japan . |
| 56-17633 | 2/1981 | Japan . |
| 63-281964 | 11/1988 | Japan . |
| 64-20468 | 2/1989 | Japan . |
| 1159053 | 6/1989 | Japan . |
| 1-177183 | 12/1989 | Japan . |
| 2-10569 | 1/1990 | Japan . |
| 2-71814 | 3/1990 | Japan . |
| 2006040 | 5/1979 | United Kingdom . |

*Primary Examiner*—Nasser Ahmad
*Attorney, Agent, or Firm*—Joseph P. Gastel

[57] ABSTRACT

An oxygen-absorbing label consisting of a base sheet, adhesive on the base sheet for securing the base sheet to an internal surface of a container, an oxygen-absorbing composition on the base sheet, and a cover sheet secured to the base sheet to confine the oxygen-absorbing composition therebetween, the cover sheet being fabricated of material which will permit oxygen to pass therethrough but will not stain due to the oxidation of the oxygen-absorbing composition or due to contact with materials in the container. A plurality of the foregoing labels are mounted on a web to be used with conventional labeling equipment.

15 Claims, 2 Drawing Sheets

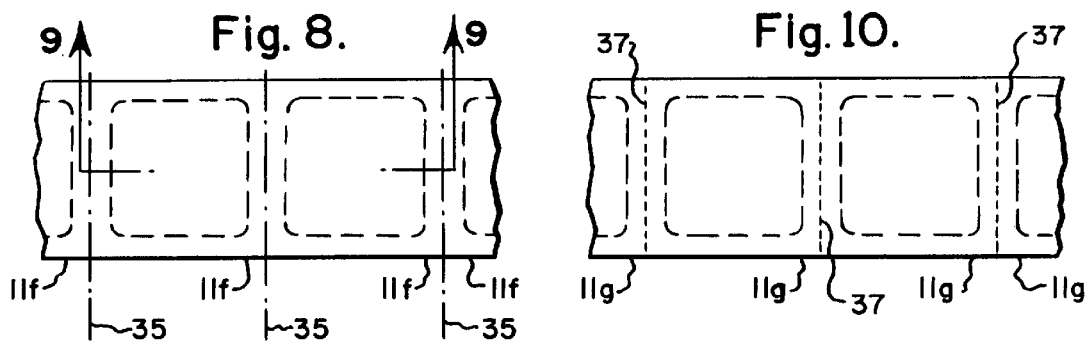
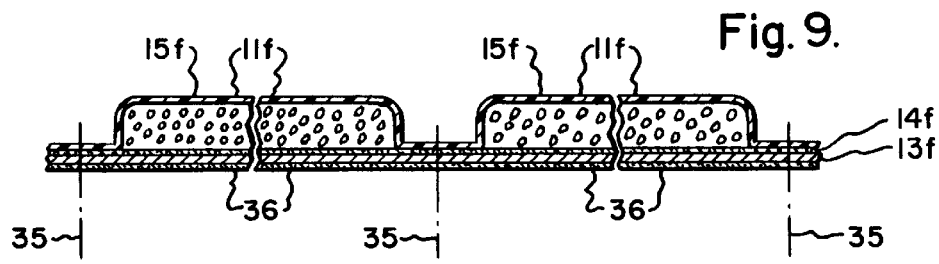
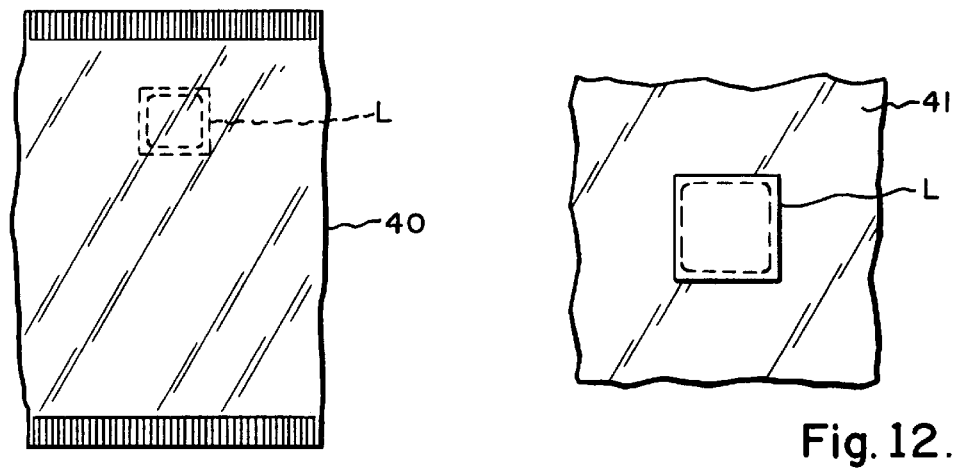
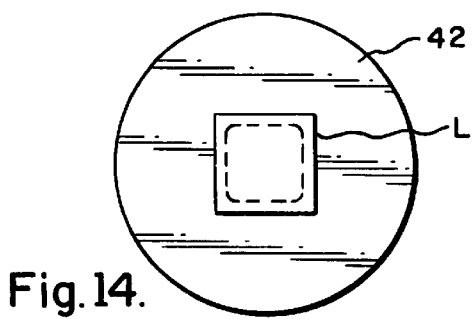
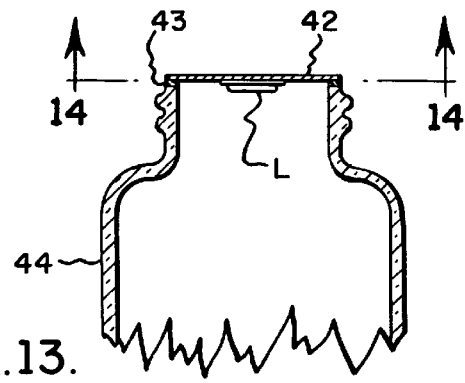

OXYGEN-ABSORBING LABEL

CROSS REFERENCE TO RELATED APPLICATION

This is a continuation of application Ser. No. 07/748,760 filed Aug. 23, 1991, now U.S. Pat. No. 5,667,863 which is a continuation-in-part of Ser. No. 07/638,494, filed Jan. 7, 1991 now abandoned.

BACKGROUND OF THE INVENTION

The present invention relates to a label which contains an oxygen-absorbing compound and to a web containing a plurality of such labels.

In various applications wherein oxygen-absorption is required, as with food products, pharaceuticals and the like, oxygen-absorption has been generally achieved by the loose placement of an oxygen-absorbing packet into a container from which oxygen was to be absorbed. This was often undesirable as the packet mixed with the contents of the container. It is also known, as indicated in U.S. Pat. No. 4,769,175, to provide a sheet-like oxygen scavenger which can be securely fixed to the inner wall of a container of food or other articles.

SUMMARY OF THE INVENTION

It is one object of the present invention to provide an oxygen-absorbing label construction which can be produced on a high speed continuous basis and can be applied to base containers on a high speed continuous basis and which contains a thin layer of oxygen-absorbing material which efficiently absorbs oxygen.

It is another object of the present invention to provide an oxygen-absorbing label containing an orientation of oxygen-absorbing compounds which are integrated in such a manner so as to attract moisture into the label in an efficient manner.

Another object of the present invention is to provide an oxygen-absorbing label for secure attachment to the inside of a container which will not stain or discolor either as a result of the oxidation of the iron contained therein or as a result of being subjected to the contents of the container.

A further object of the present invention is to provide an oxygen-absorbing label which, because of the orientation of the components therein, can be assembled in an extremely efficient and simple manner.

Yet another object of the present invention is to provide a web which contains a plurality of oxygen-absorbing labels for facilitating the handling of the labels by the use of conventional label-applying machinery. Other objects and attendant advantages of the present invention will readily be perceived hereafter.

The present invention relates to an oxygen-absorbing label comprising a base sheet, an oxygen-absorbing composition on said base sheet, and cover sheet means secured to said base sheet to confine said oxygen-absorbing composition therebetween, said cover sheet means being fabricated of material which will permit oxygen to pass therethrough and which will not stain due to oxidation of said oxygen-absorbing composition or because of contact with materials to which it may be subjected.

The present invention also relates to an oxygen-absorbing label comprising a base sheet, a cover sheet, and an oxygen-absorbing composition therebetween including particulate iron, particulate electrolyte material, and moisture-sensitive material.

The present invention also relates to an oxygen-absorbing label comprising a base sheet, a cover sheet secured to said base sheet to define a space therebetween, and a layer of particulate oxygen-absorbing material within said space.

The present invention also relates to a web, and a plurality of oxygen-absorbing labels on said web.

The various aspects of the present invention will be more fully understood when the following portions of the specification are read in conjunction with the accompanying drawings wherein:

BRIEF DESCRIPTION OF THE DRAWINGS

FIG. 8 is a fragmentary plan view of a modified form of web;

FIG. 9 is an enlarged fragmentary cross sectional view taken substantially along line 9—9 of FIG. 8;

FIG. 10 is a fragmentary plan view of a further embodiment of a web;

FIG. 11 is a front elevational view of a container having an improved oxygen-absorbing label of the present invention secured to a wall thereof;

FIG. 12 is a fragmentary enlarged view showing the oxygen-absorbing label mounted on the wall of the container of FIG. 11;

FIG. 13 is a fragmentary cross sectional view showing an oxygen-absorbing label of the present invention mounted on a safety seal secured to the mouth of a bottle; and FIG. 14 is a view taken substantially in the direction of arrows 14—14 of FIG. 13 and showing the label mounted on the safety seal.

DESCRIPTION OF THE PREFERRED EMBODIMENTS

By way of introduction, all embodiments of the labels of the present invention are flexible and can be produced on a high speed continuous basis and can be applied to containers on a high speed continuous basis. Certain of the embodiments can also be fabricated by printing techniques, and all embodiments are highly efficient because they utilize thin layers of oxygen-absorbing components.

By way of further introduction, the oxygen-absorbing labels of the present invention are intended for use in either low-moisture or high-moisture environments. In this respect, in certain containers, there is a high moisture content, and in these the labels of the present invention can contain a moisture absorbent such as silica gel or molecular sieve to absorb moisture from the container to activate the oxygen-absorbing action. In other containers, such as those having fried foods such as potato chips or the like, there is very low moisture, and in these the labels of the present invention may contain a moisture-carrying material, such as hydrogel to release moisture to activate the oxygen-absorbing action. Both of these types of material will be considered under the general nomenclature of moisture-sensitive materials, and such materials will be capable of use in any of the embodiments of the present invention, as required for specific low moisture or high moisture environments, unless their interchangeability is inconsistent with the specific embodiment.

Figure 1:
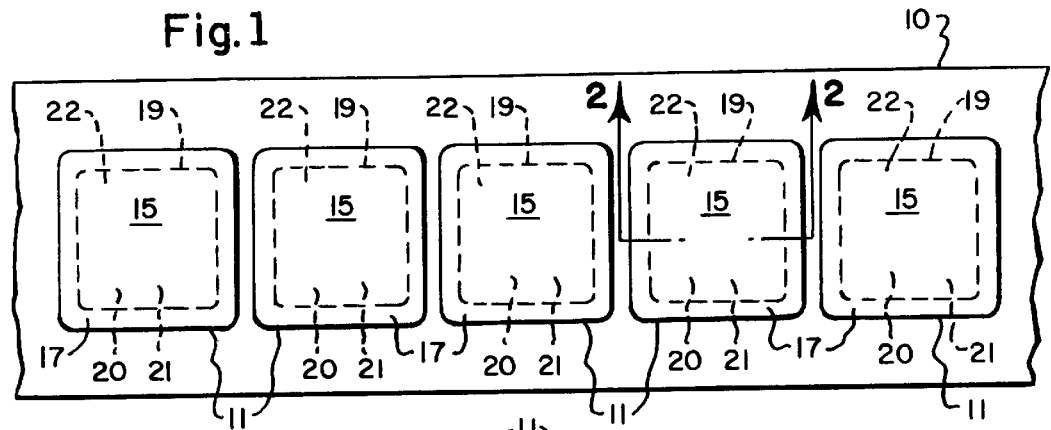
FIG. 1 is a fragmentary plan view of a web containing a plurality of oxygen-absorbing labels of the present invention.

In FIG. 1 a web 10 is shown containing a plurality of flexible oxygen-absorbing labels 11 of the present invention. Each label 11 is secured to web 10, which is fabricated of release paper so that each label 11 can be removed therefrom, by a 1 to 2 mil layer 12 of adhesive which may be any suitable pressure-sensitive adhesive. The adhesive 12 forms the underside of base sheet 13 which may be made of suitable paper or flexible plastic film 1 to 5 mils in thickness and preferably 2 to 3 mils in thickness. The flexible base sheet 13 may be moisture or vapor impervious or it may be moisture-absorbent, if moisture will not deteriorate it. If the labels are to be attached to their base container by hot melt adhesive or heat-sealable polymer, layer 12 can be made of such substances and layer 12 can be releasably secured to web 10 by any suitable means, such as an additional layer or spots of suitable adhesive. The adhesive attachment to the web 10 is by way of example only, and it will be appreciated that the labels may be attached to each other at their borders and thus the labels themselves may be formed into a web, as described more fully hereafter relative to FIGS. 8–10. In these embodiments, the labels may be separated from the web by suitable cutting machinery or they can be torn from the web along perforations between the labels.

The upper surface of base sheet 13 contains another layer of adhesive 14 which may be of the same type and thickness as adhesive film 12 which, as noted above, may be hot melt adhesive or heat-sealable polymer. Also sheet 13 can be attached to its base container and to top sheet 15 by any other suitable means including but not limited to heat-sealing, ultrasonic welding, and the various forms of attachment can be used by themselves or in suitable combinations with each other. The various forms of adhesive may include, without limitation, pressure sensitive adhesive, hot melt adhesive, cold glue and catalytically cured resin. Furthermore, the sealing by adhesive or by the other methods noted above may be by full coats or pattern coats.

A flexible top sheet 15 is secured to base sheet 13 by means of the adhesive layer 14 and this securement is around peripheral edge 17. By way of example and not limitation, top sheet 15 is fabricated from oil and water impermeable paper, coated paper, or plastic film, such as polyethylene, polypropylene, EVA or polyethyleneterephthalate, surlyn, paper, or laminates thereof which may or may not be microperforated, which is vapor and gas permeable so that oxygen gas will pass therethrough but liquid water will not. Furthermore, by being oil and water impermeable, the upper sheet 15 will not stain and thus will resist discoloration to prevent an unsightly appearance in use. The staining which is resisted is that due to the oxidation of the iron contained in the label or due to contact with the contents of the container in which the label is placed. The top sheet may be between 5 and 7 mils in thickness and more preferably between 1 and 5 mils in thickness and most preferably between 3 and 4 mils in thickness.

The top sheet 15, by virtue of its attachment to bottom sheet 13 at peripheral edge 17, encloses the oxygen-absorbing components 19 therein. The components of FIG. 2 include the two dry reactants, iron 20 and a solid electrolytic salt 21. The iron may be either hydrogen reduced iron or electrolytically reduced iron, or chemically reduced iron which will provide greater reactivity. While iron is preferred as the metallic oxygen-absorbing agent, it will be appreciated that other metals may be used. These are, by way of example and not limitation, aluminum, copper, zinc, titanium, magnesium and tin. However, they do not have the oxygen-absorbing capacity of iron. Also, other elements which can be used in elemental or partially oxidized form are sodium, manganese, iodine, sulfur and phosphorous. However, these also are not as effective as iron.

The salt may be sodium chloride, or any other suitable food compatible salt including but not limited to sodium sulfate, potassium chloride, ammonium chloride, ammonium sulfate, calcium chloride, sodium phosphate, calcium phosphate and magnesium chloride. For non-food products, other non-food compatible salts can be used. The dry reactants, namely, the iron and the salt may be between 48 and 325 mesh and may be deposited to a thickness of between 2 and 12 mils and preferably between 4 and 8 mils. The mesh sizes of the components may be the same as set forth hereafter relative to the embodiment of FIG. 4. The dry reactants 20 and 21 will adhere to the surface of the adhesive layer 14 and thus be maintained within the borders 17. Where the layer of dry reactants 20 and 21 is sufficiently thin, it will be held in position between sheets 13 and 15, and this thinness is less than about 12 mils. In other words, the particulate material will remain in substantially layer form without bunching up, especially when the label is adhered to its container base. Also, the roughness of the surfaces of the sheets 13 and 15 may prevent the particulate material from sliding out of its layer configuration. The particulate materials may be deposited by automatic machinery on a continuous intermittent basis on bottom sheet 13. Sheet 22 may also be deposited by automatic machinery.

Also included within the confines of upper sheet 15 is an absorbent sheet 22 of blotter paper or desiccant paper which is sized and/or coated as necessary. The paper sheet may also be fabricated with an electrolyte therein. A desiccant paper which contains silica gel and is identified by the grade designation SG-146 and is a product of Multiform Desiccants, Inc. may be used. The function of the blotter or desiccant paper is to attract moisture through top sheet 15 so as to combine with the solid electrolyte to thereby initiate the basic electrolytic action which is necessary for the iron to absorb oxygen which passes through top sheet 15. Absorbent sheet 22 may be between and 4 and 15 mils in thickness and more preferably between 8 to 10 mils in thickness.

When the foregoing dimensions of the various components are considered in combination, it can be seen that the label 11 has an outside range of thicknesses of between 9.5 and 46 mils, an intermediate range of thicknesses of between 18 and 31 mils and an inner range of thicknesses of between 20 and 30 mils. The thicknesses of the various layers may vary, especially the thickness of the blotter paper and/or iron and salt, depending on the amount of absorption which is required.

Figure 2:
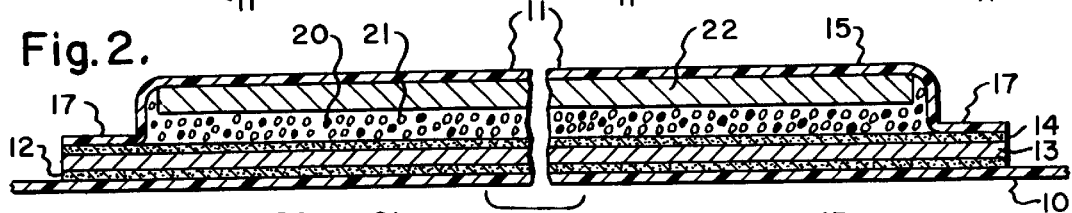
FIG. 2 is a fragmentary cross sectional view taken substantially along line 2—2 of FIG. 1 and showing one embodiment of an oxygen-absorbing label of the present invention.
Figure 3:
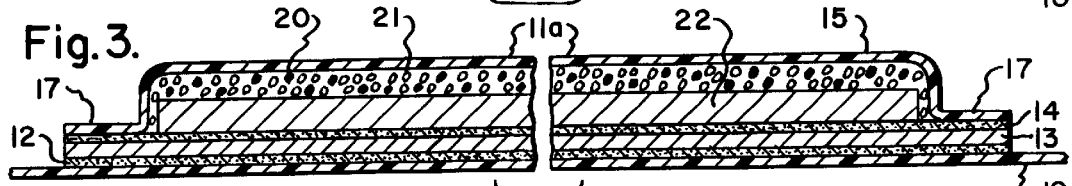
FIG. 3 is a view similar to FIG. 2 but showing a second embodiment.

In FIG. 3 a second embodiment 11a of the present invention is disclosed. Label 11a has the identical components of the label of FIG. 2 and therefore these components will be designated by identical numerals which obviates the necessity to describe them in detail, as was done relative to FIG. 2. The only difference between the embodiments of FIGS. 2 and 3 is that the absorbent sheet 22 is underneath the dry reactants 20 and 21 rather than above them as in FIG. 2. In this embodiment there is no adhesive layer, such as 14 next to the granular material 20 and 21. The advantage of the embodiment of FIG. 3 over FIG. 2 is that the absorbent sheet, by attracting moisture from the environment in which the label is located, will cause the moisture to first travel through the granular material 20 and 21, thereby hastening the reaction. On the other hand, the advantage of the embodiment of FIG. 2 over that of FIG. 3 is that the absorbent sheet 22 will hold the granular or powdered material 20 and 21 in position during the assembly of the top sheet 15 with bottom sheet 13. The sheet 22 may be positioned on bottom sheet 13 by automatic machinery and the particulate material may also be deposited by automatic machinery. Various dimensions for the labels of FIGS. 2 and 3 have been given above and expanded ranges are given in the following table.

TABLE I

RANGES OF THICKNESS OF LAYERS IN FIGS. 2 AND 3 IN MILS

| LAYER | RANGE | MORE PREFERRED RANGE | MOST PREFERRED RANGE |
|---|---|---|---|
| 12 & 14 adhesives | .5 to 2 | .5 to 1.5 | .8 to 1 |
| 13 base sheet | .5 to 5 | 1 to 4 | 1 to 3 |
| 15 top sheet | 1 to 9.5 | 2 to 7 | 2 to 4 |
| 19 (20 & 21) reactants | 1 to 32 | 2 to 12 | 4 to 8 |
| 22 absorbent sheet | 1 to 32 | 5 to 15 | 7 to 10 |
| TOTAL | 4.5 to 82.5 | 11 to 41 | 15.6 to 27 |

Figure 4:
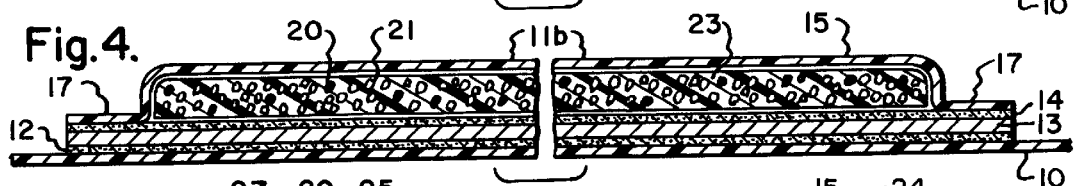
FIG. 4 is a view similar to FIG. 2 but showing a third embodiment.

Another embodiment of the present invention is disclosed in FIG. 4. The flexible label 11b of this embodiment contains certain components which are identical to those of FIG. 2, and such components are designated by identical numerals, thereby obviating the necessity for a detailed description of these components. The embodiment of FIG. 4 differs from the preceding two embodiments in that it does not contain a sheet of absorbent paper. Instead it has an active layer 23 consisting of a polymer matrix which can be latex, PVP, acrylic, vinyl, styrene, dextrins or other natural polymers, PTFE (polytetrafluoroethylene), polyolefins or acetates containing dispersed iron, of the type discussed above, electrolyte of the type discussed above and a suitable moisture-sensitive material such as silica gel, hydrogel, molecular sieve, or any other suitable composition having an affinity for carrying moisture. In this respect, in certain applications it is desired for the material to be a moisture-attracting material, such as silica gel or molecular sieve, to absorb moisture from the environment, and in other applications where the environment does not have sufficient moisture, it is desired for the material to be a moisture-carrying material, such as hydrogel. Both of the foregoing materials are characterized as being moisture-sensitive materials. In fact, in any of the embodiments of the present invention, where applicable, either a moisture-absorbing or moisture-carrying material may be used. The layer 23 may be 4 to 16 mils in thickness, and preferably between 4 and 12 mils in thickness and most preferably between 4 to 10 mils in thickness. All of the reactants in the matrix may have an outside range of between 48 and 375 mesh, an intermediate range of between 100 and 350 mesh, and an inner range of between 200 and 325 mesh. The thickness of layer 23 and the mesh size of the ingredients in the matrix will depend on the use to which label 11b is placed. The layer 23 is fabricated by mixing the ingredients with the matrix and then suitably calendaring it, casting it or extruding it in the conventional manner in which such matrices are made. If the matrix is not porous, it can be perforated to expose the active ingredients. If it is porous, then it need not be further treated to expose the active ingredients. If the matrix is relatively sparse with respect to the ingredients, the latter will merely be bound by the matrix, but will be sufficiently exposed to react with the oxygen. The sheet can be adhered to adhesive layer 14 or merely located thereon conveniently prior to assembling top sheet 15 with bottom sheet 13. The matrix may be deposited by automatic machinery. Various dimensions for the label of FIG. 4 have been given above and expanded ranges are given in the following table.

TABLE II

RANGES OF THICKNESS OF LAYERS IN FIG. 4 IN MILS

| LAYER | RANGE | MORE PREFERRED RANGE | MOST PREFERRED RANGE |
|---|---|---|---|
| 12 & 14 adhesives | .5 to 2 | .5 to 1.5 | .8 to 1 |
| 13 base sheet | .5 to 5 | 1 to 4 | 1 to 3 |
| 15 top sheet | 1 to 9.5 | 2 to 7 | 2 to 4 |
| 23 active layer | 2 to 54 | 5 to 24 | 8 to 20 |
| TOTAL | 4.5 to 72.5 | 9 to 38 | 17.6 to 29 |

Figure 5:
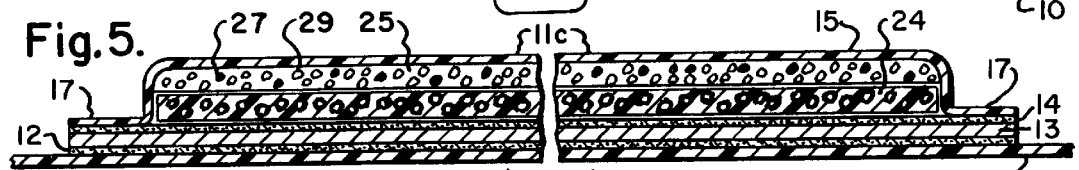
FIG. 5 is a view similar to FIG. 2 but showing a fourth embodiment.

In FIG. 5 a further embodiment 11c of the flexible label of the present invention is disclosed which has certain components which are identical to those of the preceding components and are identified by like numerals to obviate the necessity to describe them again. In this embodiment lower layer 24 is a separate flexible sheet consisting of a polymer matrix such as latex, PVP, acrylic, vinyl, styrene, dextrins, and other natural polymers, PTFE, polyolefins or acetates containing a hydrous or hydratable absorbent such as silica gel, hydrogel, molecular sieve, or any other suitable moisture-sensitive composition. This sheet may be between 1 and 6 mils thick or may have an inner range of thicknesses of between about 3 and 4 mils and may be deposited by a suitable coating process including but not limited to painting and printing. The advantages of having the material within a sheet 24 is to facilitate the assembly of label 11c by providing a fixed body as contrasted to loose granular material. The size of the hydrous or hydratable absorbent may be the same as in the preceding embodiments. Label 11c includes a layer 25 of granular materials consisting of a combination of oxidizable metal 27 and a electrolyte 29. These components may be of the exact same type and sizes described above with respect to FIG. 2 and may be within the same ranges of sizes of the embodiment of FIG. 2. As an alternate embodiment, the sheet 24 may contain the granular iron and electrolyte and the moisture-sensitive material may be laid on top of it. The polymer material may have a sufficient coefficient of friction to prevent the granular material thereon from sliding. The polymeric material of FIG. 5 may be deposited by a press or by a silk screen process or coated or painted on its base.

Figure 6:
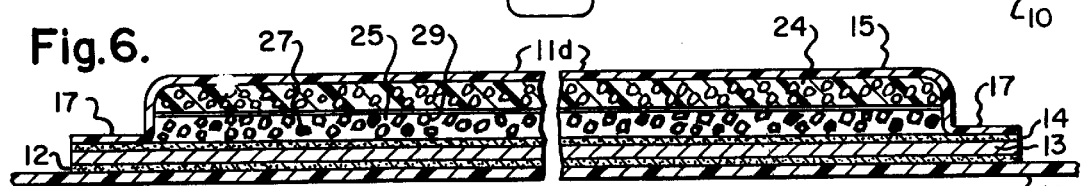
FIG. 6 is a view similar to FIG. 2 but showing a fifth embodiment.

In FIG. 6 another embodiment 11d is shown. In this embodiment all components which have the same numerals as the embodiment 11c of FIG. 5 are designated by like numerals. The only difference between the embodiments of FIG. 5 and FIG. 6 are that the layers 24 and 25 are reversed. Layer 24 can be coated on the top sheet or sprayed on the particulate material. The granular or particulate material will adhere to the adhesive in the embodiment of FIG. 6 to thereby be maintained in layer form. Various dimensions of the labels of FIGS. 5 and 6 have been given above and expanded ranges are given in the following table.

TABLE III

RANGES OF THICKNESS OF LAYERS IN FIGS. 5 AND 6 IN MILS

| LAYER | RANGE | MORE PREFERRED RANGE | MOST PREFERRED RANGE |
|---|---|---|---|
| 12 & 14 adhesives | .5 to 2 | .5 to 1.5 | .8 to 1 |
| 13 base sheet | .5 to 5 | 1 to 4 | 1 to 3 |
| 15 top sheet | 1 to 9.5 | 2 to 7 | 2 to 4 |
| 24 matrix of moisture sensitive material | .5 to 25 | 1 to 10 | 3 to 5 |
| 25 (27 & 29) reactants | 1 to 32 | 2 to 12 | 4 to 8 |
| TOTAL | 4 to 75.5 | 7 to 36 | 11.6 to 22 |

Figure 7:
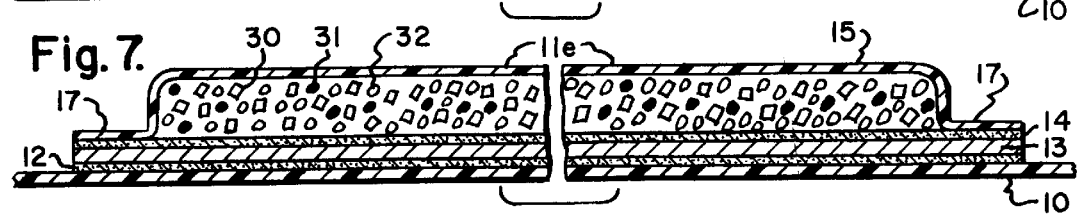
FIG. 7 is a view similar to FIG. 2 but showing a sixth embodiment.

In FIG. 7 another flexible label 11e is disclosed which is another embodiment of the present invention wherein numerals which are identical to those of FIG. 2 represent identical structure. In this embodiment all materials within top sheet 15 and bottom sheet 13 are granular or particulate and they include iron 30, dry salt 31 and a moisture carrier such as hydrogel 32, which are deposited on the adhesive layer 14 which aids in maintaining them in layer form. The iron and the salt may be of the same types and mesh sizes described above relative to FIG. 2. The hydrogel may be of the same mesh sizes as described above relative to FIG. 4. The total thickness of the components 30, 31 and 32 may be between 4 and 20 mils or may have a smaller range of between 6 and 8 mils. The exact thickness can vary depending on the amount of absorption which may be required for any particular application. Instead of using a granular moisture carrier such as hydrogel, a moisture absorber such as silica gel or the like can be used. Whether one or the other is used depends on the environment in which the label is placed, i.e., if it has moisture which it will give up or not. The particulate materials may be deposited by suitable automatic machinery. Various dimensions of the label of FIG. 7 have been given above and expanded ranges are given in the following table.

TABLE IV

RANGES OF THICKNESS OF LAYERS IN FIG. 7 IN MILS

| LAYER | RANGE | MORE PREFERRED RANGE | MOST PREFERRED RANGE |
|---|---|---|---|
| 12 & 14 adhesives | .5 to 2 | .5 to 1.5 | .8 to 1 |
| 13 base sheet | .5 to 5 | 1 to 4 | 1 to 3 |
| 15 top sheet | 1 to 9.5 | 2 to 7 | 2 to 4 |
| 30, 31 & 32 reactants | 2 to 64 | 4 to 24 | 8 to 16 |
| TOTAL | 4.5 to 82.5 | 8 to 38 | 12.6 to 25 |

Specific examples have been made in accordance with the embodiments of FIGS. 2, 3, 5 and 7. In accordance with an embodiment made of FIG. 7, the label had an outside dimension of 2½ inches times 2½ inches and it had an inner chamber 2 inches by 2 inches containing the various ingredients. The chamber contained iron, sodium chloride and silica gel. An example according to FIG. 3 was about 0.027 inches thick, and an example according to FIG. 7 was about 0.021 inches thick, when it carried a moisture-absorbing material rather than hydrogel. Low moisture versions, that is, those which carry their own moisture, would be a little thicker. In addition, the following examples have been made.

EXAMPLE 1

A label of the type shown in FIG. 3 was prepared using an oil and grease resistant paper 4.5 mils thick as the top sheet and a silica gel impregnated paper 9 mils thick with moisture adjusted to about 60%. 100 mesh electrolytic iron blended with 1.5% by weight of 200 mesh sodium chloride electrolyte was layered on top of the silica gel paper to a thickness of 8 mils, and paper 4.5 mils thick coated on both sides with 1 mil of pressure-sensitive adhesive was used as a base sheet. The complete label was about 28 mils thick, and the reactive area was about 2×2" and it contained about 0.68 grams of iron. The label was adhered to the inside wall of a closed 500 cc container of atmospheric air, and it removed more than 99.98% of oxygen from this container in 19 hours.

EXAMPLE 2

An oxygen-absorbing label of the type shown in FIG. 7 was prepared using the same type and size of top sheet and base At sheet as set forth in Example 1, and its reactive area was about 2×2" in area. An oxygen-absorbing blend of 0.38 grams of 200 mesh electrolytic iron blended with 1.5% of 200 mesh sodium chloride electrolyte by weight of the iron and 50% by weight of the entire mixture of 48 mesh silica gel was distributed on top of the base sheet where it was partially immobilized by the adhesive layer. The finished structure was about 21 mils thick, and removed over 55 cc of oxygen from a humid sealed ½ liter container of atmospheric air in 24 hours and ultimately removed 99.99% of the oxygen from the container in 96 hours. The adhesive was 2 mils thick on opposite sides of the base sheet.

EXAMPLE 3

An oxygen-absorbing label of the type shown in FIG. 7 was prepared using a nonwoven polyolefin top sheet 6.4 mils thick, and a base sheet of double pressure-sensitive adhesive coated styrene which was 3.4 mils thick which contained 2 mils of adhesive on its reactive side and one mil of adhesive on its outside. The reactive area of the label was approximately 2 inches square and contained about 0.7 grams of 48 mesh silica gel and 0.7 grams of an iron/electrolyte blend containing 0.67 grams of 200 mesh electrolytic iron and 0.03 grams of 325 mesh sodium chloride electrolyte. It had a theoretical oxygen-absorbing capacity of 206.7 cc. At 90% relative humidity the label absorbed 156 cc of oxygen from atmospheric air in 23 hours, and it absorbed a total of 172 cc of oxygen in 43 hours. The layer of the iron/electrolyte blend and the silica gel was 16 mils thick.

EXAMPLE 4

An oxygen-absorbing label of the type shown in FIG. 5 was prepared using the same top sheet and base sheet as described above in Example 3. The reactive area of the label was approximately 1½" square in area. A moisture-active 3 mil layer composed of 0.18 grams of polyuronic acid gel and blended with 0.07 grams of 60 micron hydrogel was printed onto the base sheet by the offset method using a rubber plate, after which a 5 mil thick mixture of 0.35 grams of 200 mesh electrolytic iron, and 1% of 325 mesh sodium chloride, 1% of 200 mesh calcium chloride and 1% of 80 mesh calcium oxide by weight was deposited and was thus immobilized in a thin reactive layer. The resulting label was about 21 mils thick. In a dry sealed environment the label reduced approximately 76% of its theoretical maximum capacity of oxygen in the first 24 hours and 87% after 68 hours.

EXAMPLE 5

An oxygen-absorbing label of the type shown in FIG. 7 was prepared using the same top sheet and base sheet as described in Example 3. The reactive area was about 3/4"× 3/4". The adhesive layer on the reactant side was 2 mils thick and of the acrylic, pressure-sensitive type which has the capability of absorbing a certain amount of moisture on its own and thus could function as the moisture active component. A 6 mil dry film of iron, consisting of 0.05 grams of 200 mesh electrolytic iron with 1.5% salt and 0.05 grams of 100 mesh iron with 1.5% salt, was layered onto the adhesive layer to produce a finished label about 19 mils thick. It absorbed 15 cc of oxygen from a moist container in 24 hours and had an ultimate capacity of 23 cc of oxygen.

As is well known, the stoichiometric equivalent of iron required to remove 100 cc of oxygen is 0.325 grams. In any system, multiples of this amount are used depending on the amount of oxygen which is to be absorbed and the reaction rate, which depends on the manner in which the iron is positioned. More specifically, when the iron is packaged in bulk in a packet contains granular or powdered iron, it has been observed that 0.85 grams are required to absorb 100 cc of oxygen in 24 hours, whereas when it is positioned in a layer in a label wherein the thickness of the iron and salt was 8 mils, 0.67 grams were required to absorb 100 cc of oxygen in 24 hours. The smaller amount of iron which is required is due to the fact that it is distributed in a thin layer so that there is a greater exposure of the surface of the particulate iron to the oxygen.

The efficiency of utilizing relatively thin layers of oxygen absorbing materials in a label format is set forth in the following table wherein:

Column 1 designates the type of label as shown in the various figures of the drawing and each label contained sufficient moisture to produce electrolytic action.
Column 2 designates the size of the reactive area within the label
Column 3 designates the weight in grams of iron 100 mesh or finer.
Column 4 designates the thickness of the oxygen-absorbing material (Fe) in mils excluding the moisture active material
Column 5 designates the theoretical oxygen-absorbing capacity of the label in cubic centimeters of oxygen
Column 6 designates the cubic centimeters of oxygen absorbed by the label in 24 hours
Column 7 designates the total amount in cubic centimeters of oxygen ultimately absorbed by the label.

TABLE V

| OXYGEN ABSORBING EFFICIENCY | | | | | | |
|---|---|---|---|---|---|---|
| 1 | 2 | 3 | 4 | 5 | 6 | 7 |
| FIG. 3 (perforated polyester top sheet) | 1.5 × 2" | .4 | 5 | 123 | 80.8 | N/A |
| FIG. 3 | 2" sq. | .35 | 4 | 103.4 | 70.3 | 99.2 |
| FIG. 7 | 2" sq. | .35 | 4 | 103.4 | 52 | 98.5 |
| FIG. 7 | 2" sq. | .70 | 8 | 206.75 | 164 | 190 |
| FIG. 7 | 1" sq. | .14 | 8 | 42 | 29 | 36 |
| FIG. 5 | 1.5" sq. | .35 | 7 | 103.4 | 67 | 95 |

In the labels, the amount of sodium chloride salt which is required to perform the celectrolytic function should be between 2% and 2.5% by weight of the amount of iron which is being used. However, the amount of sodium chloride is not really critical. There is only a need for the amount to be sufficient to effect the required electrolytic action. In this respect, above about 3.5% there is no increase in the reaction rate and below about 1%, a decrease in the reaction rate has been observed, but the reaction still does occur. If salts other than sodium chloride are used, their weights should be the stoichiometic equivalent of the weight of the sodium chloride.

In dry environments wherein the oxygen absorber label has to supply moisture for the oxygen-absorbing reaction between about 30% and 100% of water by weight of the iron should be present, and preferably between about 40% and 80% by weight and most preferably between about 40% and 60% by weight of the iron. It will be understood that the actual amount of water which is required in a particular formulation depends on the amount of water which the environment is expected to contribute, that is, whether the environment is dry so that all water is required or whether it has some moisture so that only some water is required. Additionally the amount of moisture-sensitive material which is used under the foregoing circumstances depends on its water content and its water affinity. By way of example, considering that it is desired that moisture should preferably be present in an amount of between 40–60% by weight of iron in the oxygen-absorbing mixture containing iron and electrolyte, and considering that a given amount of moisture-absorbing blotter paper can carry 30–35% of its own weight as moisture, and thus it is necessary to use moist blotter paper at about 1.5 times the weight of iron to provide 40–60% of the weight of iron as moisture. However, hydrogel contains 50–60% water and therefore it is necessary to use hydrogel in the amount of only 80–100% of the weight of iron to provide 40–60% of the weight of iron as moisture. Thus, when hydrogel is used rather than blotter paper, the resulting composition has less bulk. Hydrogel is also more useful in a dry environment since it partially binds the water, thereby preventing its loss to the environment by evaporation.

There are other oxygen-absorbing systems which can be efficiently incorporated into labels. By way of example, and not of limitation, such systems are as follows:

A mixture of particulate sodium thiosulfate and particulate calcium hydroxide and a particulate electrolytic salt will absorb oxygen according to the following reaction:

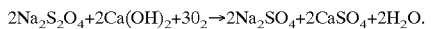

$$2Na_2S_2O_4 + 2Ca(OH)_2 + 3O_2 \rightarrow 2Na_2SO_4 + 2CaSO_4 + 2H_2O.$$

In addition, particulate ascorbic acid and a particulate electrolytic salt can be used to absorb oxygen according to the following reaction:

Ascorbic acid+$O_2$→Dehydroascorbic acid+$H_2O$.

Each of the two preceding oxygen-absorbing systems can be utilized in the embodiment of FIG. 7 or in any of the other embodiments of FIGS. 1–6 wherein any of the components are either utilized in a matrix or a combination of a matrix and free particulate matter. Also the two preceding systems can be used alone or in combination with oxidizable metal salts. Some phenolic compounds are sufficiently easily oxidized so as to be useful. Among these are catechol, hydroquinone and pyrogallol.

It is also possible to use biological systems in label format. Enzymatic oxygen-absorbing reactions include those using glucose oxidase and alcohol oxidase in combination with appropriate substrates. Also aerobic organisms can also be used in label format inasmuch as they consume oxygen through normal respiration, and it is believed that yeast falls into this category.

While the above description relative to FIGS. 1–7 has shown the labels which are detachable from a web, it is within the contemplation of the present invention to incorporate the labels themselves as part of a web. Accordingly, one embodiment is shown in FIG. 8 wherein labels 11f may be any one of the labels described above, the only difference being that they are not mounted on a web 10. Instead the bottom sheet 13f, which corresponds to bottom sheets 13 of the preceding embodiments is continuous as is top sheet 15f which corresponds to top sheets 15 of the preceding embodiments. A layer 36 of adhesive may be located on the underside of bottom sheet 13f. The contents within each of the labels 11f may be any of the contents described above. The labels 11f may be separated each other along lines 35 by suitable cutting machinery during the process of installation.

Another embodiment of the present invention is shown in FIG. 10 wherein labels 11g may each be identical to any of the embodiments described above including those of FIG. 8. The only difference between the embodiment of FIG. 10 and the embodiment of FIG. 8 is that the web of labels 11g of FIG. 10 are separated from each other by perforations 37 so that they can be separated from each other.

It is to be especially again noted that all labels disclosed above may be made on a continuous basis by automatic machinery and they can also be applied by automatic machinery. In addition, all embodiments possess thin layers of oxygen-absorbing materials which absorb oxygen in a highly efficient manner, and such thin layers, in addition, are instrumental in causing the labels themselves to be relatively thin.

It is also to be especially noted while the specific embodiments described above have been described as containing an adhesive layer 12 for securing the labels to a base, that is, a foreign body, such as the inside of a container, it will be appreciated that other ways of attaching the labels are within the contemplation of the present invention. In this respect, adhesive can be applied to the labels or to their base, that is, the foreign body, at the time of installation. Alternatively, where the labels are made of suitable material such as plastic, they can be heat-sealed to their base, or foreign body, around their perimeter, and in this sense the perimeter comprises the means for securing the label to a foreign body. Also, the labels can be secured to their bases in any suitable manner of attachment. At this point it is to be again stressed that the positive securing of the labels to their bases, such as a container, prevents them from mixing with the contents of the container by making them an integral part of the latter.

It is to be especially noted that the flexibility of all of the labels of the present invention enhances the ease with which they can be fabricated, handled and applied to foreign bodies. Furthermore, where the foreign bodies are flexible containers, such as the bag of FIG. 11, they will flex with the container and therefore maintain good contact therewith.

Representative ways of using any of the embodiments of the present invention are depicted in FIGS. 11–14. In FIGS. 11 and 12 a package 40 is shown having a label L attached to the inside wall 41 thereof. As noted above, label L can be any one of the preceding embodiments or modifications thereof which is attached to wall 41 by any suitable means, as described above. The label L is attached to wall 41 before the bag is formed, that is, while the material of the bag is still in strip form, and it becomes part of the inside of the bag after fabrication. It will be appreciated that labels L can be secured to the inside of box-like containers in the same manner.

In FIGS. 13 and 14 another way of utilizing a label L is shown. In this respect, it is adhesively secured to the underside of a safety seal 42 secured to the mouth 43 of a bottle 44. The safety seal 42 and its attached label L can comprise a subcombination which is applied to the mouth of the bottle.

While the preceding description has been directed to various embodiments of flexible labels on a web, it is within the scope of the present invention to have individual labels, with or without adhesive. Such labels can be used or stacked for dispensing from automatic labeling machinery, or can be applied by hand.

While preferred embodiments of the present invention have been disclosed, it will be appreciated that the present invention is not limited thereto but may be otherwise embodied within the scope of the following claims.

What is claimed is:

1. An oxygen-absorbing label consisting of a base sheet, a gas permeable cover sheet, a first adhesive between said base sheet and said cover sheet to secure said cover sheet to said base sheet to define a space therebetween, a substantially uniform layer of oxygen-absorbing material confined in said space between said base sheet and said cover sheet, a seperate substantially uniform sheet of moisture-attracting material also confined in said space, said layers of oxygen-absorbing material and moisture-absorbing paper overlying each other and being in direct contact, one of said layers being immediately adjacent said cover sheet, said cover sheet being secured to said base sheet by said first adhesive along a border area which is outwardly of said space and which is free of said oxygen-absorbing material, and a second adhesive on said base sheet on the opposite side thereof from said gas permeable cover sheet for adhesively securing said label to a foreign body.

2. An oxygen-absorbing label as set forth in claim 1 wherein said sheet of moisture-attracting material is blotter paper.

3. An oxygen-absorbing label as set forth in claim 2 wherein said blotter paper is located between said layer of oxygen-absorbing material and said base sheet.

4. An oxygen-absorbing label as set forth in claim 3 wherein said first adhesive extends into said space, and said blotter paper is secured to said first adhesive.

5. An oxygen-absorbing label as set forth in claim 2 wherein said blotter paper is located between said layer of oxygen-absorbing material and said gas-permeable cover sheet.

6. An oxygen-absorbing label as set forth in claim 5 wherein said first adhesive extends into said space, and said oxygen-absorbing material is secured to said first adhesive.

7. An oxygen-absorbing label as set forth in claim 1 wherein said sheet of moisture-attracting material is desiccant paper.

8. An oxygen-absorbing label as set forth in claim 7 wherein said desiccant paper is located between said layer of oxygen-absorbing material and said base sheet.

9. An oxygen-absorbing label as set forth in claim 8 wherein said first adhesive extends into said space, and said desiccant paper is secured to said first adhesive.

10. An oxygen-absorbing label as set forth in claim 7 wherein said desiccant paper is located between said layer of oxygen-absorbing material and said cover sheet.

11. An oxygen-absorbing label as set forth in claim 10 wherein said first adhesive extends into said space, and said oxygen-absorbing material is secured to said first adhesive.

12. An oxygen-absorbing label as set forth in claim 1 wherein said sheet of moisture-attracting material is located between said layer of oxygen-absorbing material and said base sheet.

13. An oxygen-absorbing label as set forth in claim 12 wherein said first adhesive extends into said space, and said sheet of moisture-attracting material is secured to said first adhesive.

14. An oxygen-absorbing label as set forth in claim 1 wherein said sheet of moisture-attracting material is located between said oxygen-absorbing material and said cover sheet.

15. An oxygen-absorbing label as set forth in claim 14 wherein said first adhesive extends into said space, and said moisture-attracting material is secured to said first adhesive.

* * * * *